(12) United States Patent
Balachandran et al.

(10) Patent No.: US 11,858,497 B2
(45) Date of Patent: Jan. 2, 2024

(54) OPERATOR DRIFT MAINTENANCE

(71) Applicant: TOYOTA RESEARCH INSTITUTE, INC., Los Altos, CA (US)

(72) Inventors: Avinash Balachandran, Sunnyvale, CA (US); Yan Ming Jonathan Goh, Palo Alto, CA (US); John Subosits, Menlo Park, CA (US); Michael Thompson, San Juan Capistrano, CA (US); Alexander R. Green, Redwood City, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 289 days.

(21) Appl. No.: 17/346,997

(22) Filed: Jun. 14, 2021

(65) Prior Publication Data

US 2022/0396259 A1 Dec. 15, 2022

(51) Int. Cl.
| | | |
|---|---|---|
| *B60W 30/02* | (2012.01) | |
| *B60W 10/02* | (2006.01) | |
| *B60W 10/06* | (2006.01) | |
| *B60W 10/08* | (2006.01) | |
| *B60W 10/18* | (2012.01) | |
| *B60W 10/20* | (2006.01) | |

(Continued)

(52) U.S. Cl.
CPC .......... *B60W 30/02* (2013.01); *B60W 10/02* (2013.01); *B60W 10/06* (2013.01); *B60W 10/08* (2013.01); *B60W 10/18* (2013.01); *B60W 10/20* (2013.01); *B60W 30/09* (2013.01); *B60W 60/0015* (2020.02)

(58) Field of Classification Search
CPC ...... B60W 10/02; B60W 10/06; B60W 10/08; B60W 10/18; B60W 10/20; B60W 30/02; B60W 30/09; B60W 60/0015; B60W 2050/0031; B60W 30/18009
See application file for complete search history.

(56) References Cited

U.S. PATENT DOCUMENTS

| | | | |
|---|---|---|---|
| 4,953,654 A | 9/1990 | Imaseki | |
| 4,974,875 A * | 12/1990 | Sugasawa | B62D 6/04 |
| | | | 280/5.506 |

(Continued)

*Primary Examiner* — Phutthiwat Wongwian
*Assistant Examiner* — Arnold Castro
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods of controlling a vehicle in a stable drift are provided. With the goal of enhancing the driver experience, the disclosed drift control systems provide an interactive drift driving experience for the driver of a vehicle. In some embodiments, a driver is allowed to take manual control of a vehicle after a stable drift is initiated. For safety reasons, an assisted driving system may provide corrective assistance to prevent the vehicle from entering an unstable/unsafe drift. In other embodiments, an autonomous driving system retains control of the vehicle throughout the drift. However, the driver may perform "simulated drift maneuvers" such as counter-steering, and clutch kicking in order to communicate their desire to drift more or less aggressively. Accordingly, the autonomous driving system will effectuate the driver's communicated desire in a manner that keeps the vehicle in a safe/stable drift.

17 Claims, 10 Drawing Sheets

(51) Int. Cl.
 *B60W 30/09* (2012.01)
 *B60W 60/00* (2020.01)

(56) References Cited

U.S. PATENT DOCUMENTS

| | | | |
|---|---|---|---|
| 5,480,219 A | 1/1996 | Kost | |
| 6,226,581 B1 * | 5/2001 | Reimann | B60W 40/11 |
| | | | 701/48 |
| 6,637,543 B2 * | 10/2003 | Card | B62D 7/159 |
| | | | 701/41 |
| 6,681,180 B2 * | 1/2004 | Bevly | B60T 8/172 |
| | | | 701/470 |
| 8,116,941 B2 * | 2/2012 | Ammon | B60G 17/0163 |
| | | | 701/41 |
| 9,296,424 B2 * | 3/2016 | Cotgrove | B62D 15/025 |
| 10,077,051 B2 * | 9/2018 | Reinisch | G09B 9/04 |
| 10,118,605 B2 * | 11/2018 | Zhao | B60K 6/448 |
| 10,272,925 B1 | 4/2019 | Wicks | |
| 10,513,254 B2 * | 12/2019 | Fodor | B60W 10/06 |
| 10,731,545 B2 | 8/2020 | Xiao | |
| 10,773,708 B2 | 9/2020 | Ruybal | |
| 2014/0297120 A1 * | 10/2014 | Cotgrove | B60T 8/17552 |
| | | | 701/41 |
| 2015/0298702 A1 * | 10/2015 | Reinisch | B60W 30/18145 |
| | | | 701/41 |
| 2018/0009443 A1 * | 1/2018 | Norstad | B60W 10/22 |
| 2018/0251106 A1 | 9/2018 | Kasteel | |
| 2018/0257631 A1 * | 9/2018 | Fodor | B60W 10/02 |
| 2019/0176801 A1 * | 6/2019 | Ruybal | B60K 6/52 |
| 2020/0216085 A1 | 7/2020 | Bobier-Tiu | |
| 2022/0080837 A1 * | 3/2022 | Pettersson | B60T 8/17558 |
| 2023/0046970 A1 * | 2/2023 | Li | B60W 30/18172 |

* cited by examiner

OPERATOR DRIFT MAINTENANCE

TECHNICAL FIELD

The present disclosure relates generally to automotive systems and technologies, and more particularly, some embodiments relate to automated and assisted driving systems which control a vehicle during drift driving.

DESCRIPTION OF RELATED ART

A few current technologies consider automated or autonomous control of a vehicle while drifting/sliding/slipping. Drifting occurs when the tires of a vehicle lose traction with the road surface. More specifically, there is a limit to the amount of lateral frictional force a vehicle's tires can exert on a road surface. Within this peak force limit, a vehicle operates in a grip driving operating range (i.e. the range of operating conditions where the vehicle's tires maintain traction with the road's surface). Past this peak force limit, the tires will saturate (i.e. lose traction with the road), and enter a drift driving operating range.

BRIEF SUMMARY OF THE DISCLOSURE

According to various embodiments of the disclosed technology, a method for providing corrective assistance to a driver who is manually controlling a vehicle during a drift is provided. The method, in accordance with embodiments of the technology disclosed herein comprises (1) initiating, by an electronic control unit (ECU) of a vehicle, a stable drift; and (2) in response to manual control operations performed by a driver of the vehicle during the stable drift, providing, by the ECU, corrective assistance in order to prevent the vehicle from entering an unstable drift. In some embodiments, initiating the stable drift may comprise optimizing control of the vehicle across multiple actuators of the vehicle. Providing corrective assistance in order to prevent the vehicle from entering an unstable drift may be accomplished in a similar way. In these embodiments, the multiple vehicle actuators may comprise a throttle actuator, a steering actuator, a clutch actuator, and a brake actuator. Moreover, in some embodiments, initiating the stable drift and providing corrective assistance in order to prevent the vehicle from entering an unstable drift may be based, in part, on an understanding of a vehicle state space.

In various embodiments, a method for autonomously controlling a vehicle throughout a drift, while responding to simulated drift maneuvers performed by a driver of the vehicle, is provided. The method, in accordance with embodiments of the technology disclosed herein comprises (1) initiating, by an ECU of a vehicle, a stable drift; and (2) in response to simulated drift maneuvers performed by a driver of the vehicle during the stable drift, controlling, by the ECU, the vehicle in a manner that prevents the vehicle from entering an unstable drift. In some embodiments, controlling the vehicle in response to simulated drift maneuvers in a manner that prevents the vehicle from entering an unstable drift may comprise: (a) obtaining, from one or more sensors of the vehicle, signals associated with the driver of the vehicle performing simulated drift maneuvers on one or more interfaces of the vehicle; (b) interpreting the signals associated with the simulated drift maneuvers as a request for a desired drift condition; (c) limiting the desired drift condition to a stable drift condition which approximates the desired drift condition; and (d) optimizing control of the vehicle across multiple actuators of the vehicle in order to achieve the stable drift condition which approximates the desired drift condition. In certain embodiments, the vehicle interfaces may comprise an accelerator pedal, a steering wheel, a brake pedal, and a clutch pedal; and the vehicle actuators may comprise a throttle actuator, a steering actuator, a brake actuator, and a clutch actuator. Further, as alluded to above, initiating the stable drift, and controlling the vehicle in response to simulated drift maneuvers in a manner that prevents the vehicle from entering an unstable drift may be based, in part, on an understanding of a vehicle state space. Similarly, limiting the desired drift condition to a stable drift condition which approximates the desired drift condition may comprise correlating the desired drift condition to the vehicle state space.

In one embodiment of the disclosed technology, a vehicle system is provided. The vehicle system comprises an ECU including machine executable instructions in non-transitory memory to: (1) initiate a stable drift for the vehicle; and (2) in response to manual control operations performed by a driver of the vehicle during the stable drift, provide corrective assistance in order to prevent the vehicle from entering an unstable drift, or in response to simulated drift maneuvers performed by a driver of the vehicle during the stable drift, control the vehicle in a manner that prevents the vehicle from entering an unstable drift; by sending drift control signals to one or more of a steering-by-wire system, a throttle-by-wire system, a clutch-by-wire system, and a brake-by-wire system, each communicating manual control operations and simulated drift maneuvers performed by the driver to the ECU, and actualizing drift control signals sent by the ECU.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
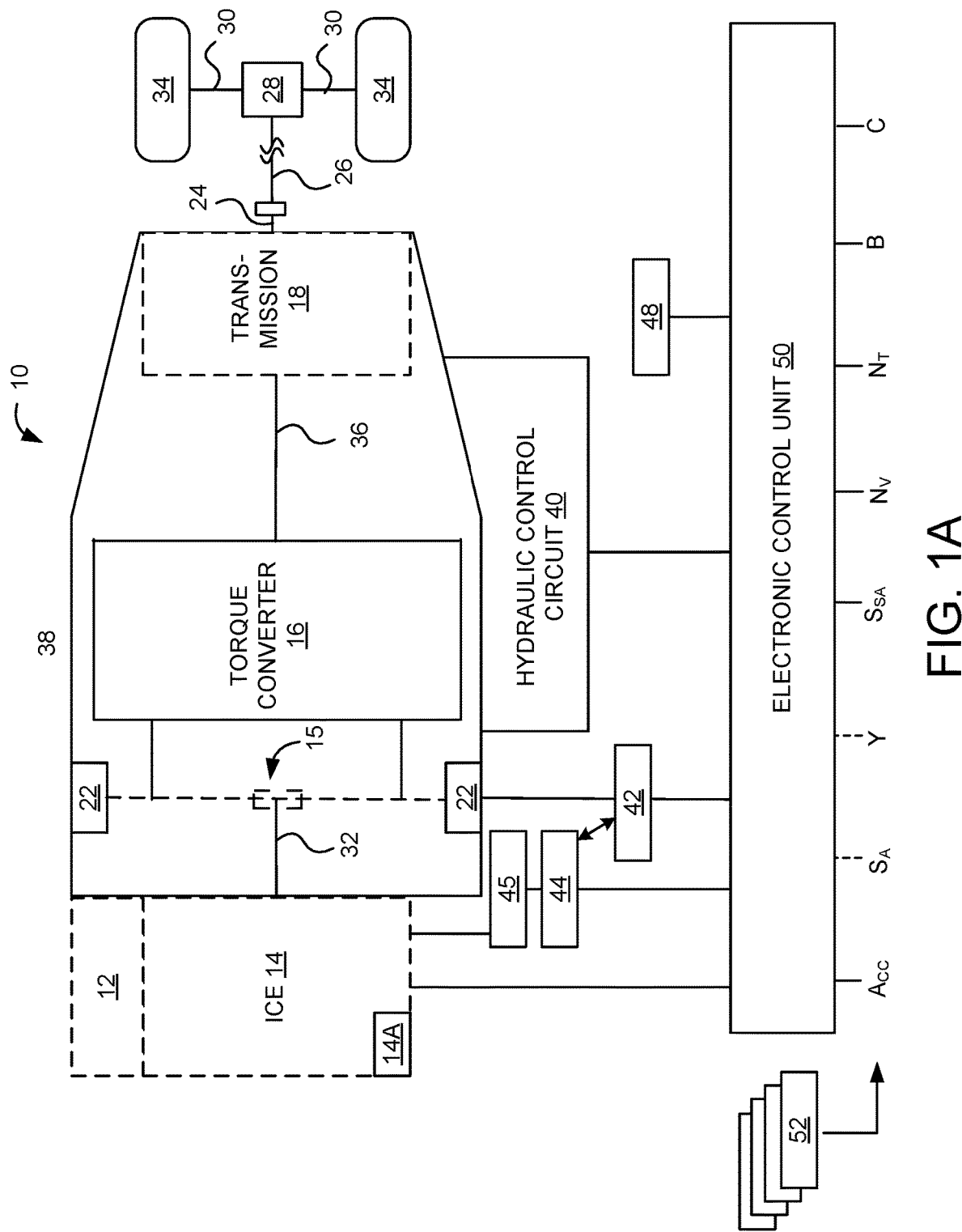
FIG. 1A illustrates an example of a vehicle with which systems and methods for facilitating an interactive drift driving experience for a driver, while maintaining a safe/stable drift, can be implemented in accordance with one embodiment of the present disclosure.

The figures are not exhaustive and do not limit the present disclosure to the precise form disclosed.

DETAILED DESCRIPTION

Drifting/sliding/slipping occurs when the tires of a vehicle lose traction with the road surface. As alluded to above, there is a limit to the amount of lateral frictional force a vehicle's tires can exert on a road surface. Past this peak force limit, the tires will saturate (i.e. lose traction with the road), and begin to drift/slip. Drifting has a reputation for being dangerous because both human drivers and autonomous control technologies have trouble managing the dual objectives of path tracking (i.e. controlling where the vehicle is going), and restoring stability (i.e. restoring traction between the tires and the road, and/or stopping the vehicle from spinning out of control) while drifting. For this reason, most automated/assisted driving technologies look primarily at the grip driving range and try to limit the vehicle's performance so that the tires will always be below their peak force capability. By limiting the vehicle's performance in this way, the vehicle will stay within the grip driving range and autonomous control algorithms that work in that range can be applied.

However, in certain situations, a driver may want to drift. For example, many race car drivers intentionally cause a vehicle to drift in order to navigate sharp turns at peak efficiency. While drifting, the vehicle will often point in a different direction than it is moving. Put another way, the racer operates the vehicle at a high sideslip angle (i.e. the angle between the direction the vehicle is pointing, and the vehicle's linear velocity vector). In this way, the racer is able to navigate the turn faster than would be possible in the grip driving range.

Racers are able to control/manipulate the drift condition of the vehicle in a number of ways. For example, racers may use a counter-steering technique (i.e. rotating the steering wheel counter to the desired direction of a turn, for example, steering left to turn right), in order to increase the aggressiveness of a drift. Racers may also perform clutch kicks (i.e. a depression and sudden release of the clutch pedal which jolts the driveline of the vehicle) in order to increase the aggressiveness of mild drifts, and/or initiate drifts. More generally, racers are able to manipulate the throttle, steering, brakes, and clutch of a vehicle in order to control it during a drift.

Outside the professional racing context, drift driving/learning to drift drive can be a fun activity which enhances the driver experience. However, as alluded to above, controlling a drifting vehicle can be difficult for inexperienced drivers. Initiating a drift can be even more difficult (and dangerous). For this reason, an automated/assisted driving system which facilitates an interactive drift driving experience for the driver, while maintaining a safe/stable drift, is highly desirable.

Accordingly, embodiments of the technology disclosed herein are directed towards systems and methods of using an autonomous/assisted driving system to maintain a stable drift (i.e. the range of operating conditions where a vehicle is both drifting, and controllable) while providing an interactive drift driving experience for the driver.

In a first set of embodiments, a driver is allowed take manual control of the vehicle once a stable drift has been initiated. The driver is able to use steering, throttle, clutch, and brakes in order to control the vehicle in the drift. In these embodiments, the autonomous/assisted driving system merely provides corrective assistance. In some embodiments, the autonomous/assisted driving system may provide corrective assistance when the driver attempts to enter an unstable drift condition. Put another way, in response to manual control operations performed by the driver, the automated/assisted driving system will provide corrective assistance in order to prevent the vehicle from entering an unstable drift.

In a second set of embodiments, an autonomous driving system maintains control of the vehicle throughout the drift. However, a driver of the vehicle is provided with multiple vehicle interfaces on which to perform "simulated" drift maneuvers, which may communicate the driver's desire to (1) enter a more aggressive drift; (2) enter a less aggressive drift; or (3) exit the drift. As will be described in greater detail below, the autonomous driving system interprets these simulated drift maneuvers as a request to enter a desired drift condition. The autonomous driving system then controls the vehicle in order to achieve the desired drift condition (or a stable approximation of the desired drift condition).

Importantly, in all of these embodiments, the autonomous/assisted driving system utilizes the full actuation capability of the vehicle (i.e. throttle, steering, brakes, and clutch) in order to control the vehicle in a drift. As will be discussed in greater detail below, by utilizing the full actuation capability of the car, these embodiments are able to achieve a broader range of drifting/driving effects than would be possible using a smaller number of actuators (e.g. throttle and steering).

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1A. Although the example described with reference to FIG. 1A is a hybrid type of vehicle, the systems and methods for facilitating an interactive drift driving experience for the driver while maintaining a safe/stable drift, can be implemented in other types of vehicle including gasoline- or diesel-powered vehicles, fuel-cell vehicles, electric vehicles, or other vehicles.

FIG. 1A illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16 and/or clutch 15, a transmission 18, a differential gear device 28, and a pair of axles 30.

As an HEV, vehicle 10 may be driven/powered with either or both of internal combustion engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses internal combustion engine 14 and the motor(s) 22 as the sources of motive power. In the engine-only and HEV travel modes, vehicle 10 relies on the motive force generated at least by internal combustion engine 14, and a clutch 15 may be included to engage internal combustion engine 14. In the EV travel mode, vehicle 10 is powered by the motive force generated by motor 22 while internal combustion engine 14 may be stopped and clutch 15 disengaged.

Internal combustion engine 14 can be an internal combustion engine such as a gasoline, diesel or similarly powered engine in which fuel is injected into and combusted in a combustion chamber. A cooling system 12 can be provided to cool the internal combustion engine 14 such as, for example, by removing excess heat from internal combustion engine 14. For example, cooling system 12 can be implemented to include a radiator, a water pump and a series of cooling channels. In operation, the water pump circulates coolant through the internal combustion engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of internal combustion engine 14. In other applications, either or both the water pump and the fan may be operated by electric current such as from battery 44.

An output control circuit 14A may be provided to control drive (output torque) of internal combustion engine 14. Output control circuit 14A may include a throttle actuator to control an electronic throttle valve that controls fuel injection, an ignition device that controls ignition timing, and the like. Output control circuit 14A may execute output control of internal combustion engine 14 according to a command control signal(s) supplied from an electronic control unit 50, described below. Such output control can include, for example, throttle control, fuel injection control, and ignition timing control. Throttle commands from a driver of vehicle 10 may be communicated by wire to electronic control unit 50 via an accelerator pedal position sensor attached to the accelerator pedal (not pictured). The accelerator pedal position sensor may be one of sensors 52, described below.

Motor 22 can also be used to provide motive power in vehicle 10 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from internal combustion engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage internal combustion engine 14 from the drivetrain of the vehicle. In the illustrated example, a crankshaft 32, which is an output member of internal combustion engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator.

Clutch 15 may be controlled using a clutch-by-wire system. In this system, the engagement of the clutch may be controlled by a clutch actuator (not pictured). Electronic control unit 50 may control the clutch actuator. Clutch commands may be communicated from the driver of vehicle 10 to electronic control unit 50 via a clutch pedal position sensor positioned on the clutch pedal of vehicle 10. In some embodiments, this sensor may be one of sensors 52.

Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from internal combustion engine 14 is not delivered to the torque converter 16. In a slip engagement state, clutch 15 is engaged, and motive power is provided to torque converter 16 according to a torque capacity (transmission torque) of the clutch 15.

Vehicle 10 may further include a brake-by-wire system (not pictured). In this system, a brake actuator may control the application of brakes to wheels 34. Electronic control unit 50 may control the brake actuator. Braking commands may be communicated from the driver of vehicle 10 to electronic control unit 50 via a brake pedal position sensor positioned on the brake pedal of vehicle 10. In some embodiments, vehicle 10 may also include a hand brake/parking brake which is connected by wire to electronic control unit 50 in a similar fashion.

Vehicle 10 may also include a steering-by-wire system (not pictured). In this system, a steering actuator may control the direction of wheels 34. Electronic control unit may control the steering actuator. Steering commands may be communicated from the driver of vehicle 10 to electronic control unit 10 via a steering angle sensor positioned on the steering wheel of vehicle 10.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. As will be discussed in greater detail below, electric control unit 50 may be used to control vehicle 10 in order to maintain a stable drift, and to effectuate a desired drift condition communicated by a driver of vehicle 10. Electronic control unit 50 can include a plurality of electronic control units such as, for example, an electronic engine control module, a powertrain control module, a transmission control module, a steering control module, a clutch control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to throttle/accelerator operation amount, $A_{CC}$, a steering angle, $S_A$, of the steering wheel, yaw rate of the vehicle, Y (e.g. the angular velocity of the vehicle around its yaw axis), sideslip angle of the vehicle, $S_{SA}$ (e.g. the angle between the direction the vehicle is pointing and the vehicle's linear velocity vector), and vehicle speed, $N_V$. These may also include torque converter 16 output, $N_T$ (e.g., output amps indicative of motor output), brake operation amount/pressure, B, and clutch operation amount/pressure, C. Accordingly, vehicle 10 can include a plurality of sensors 52 that can be used to detect various conditions internal or external to the vehicle and provide sensed conditions to engine control unit 50 (which, again, may be implemented as one or a plurality of individual control circuits).

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. For example, while vehicle 10 is drifting, a clutch pedal position sensor may be able to interpret a quick depression and release of the clutch pedal (i.e. an attempt at a "clutch kick") as an indication that the driver of vehicle 10 wants to increase the aggressiveness of the drift. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 1B:
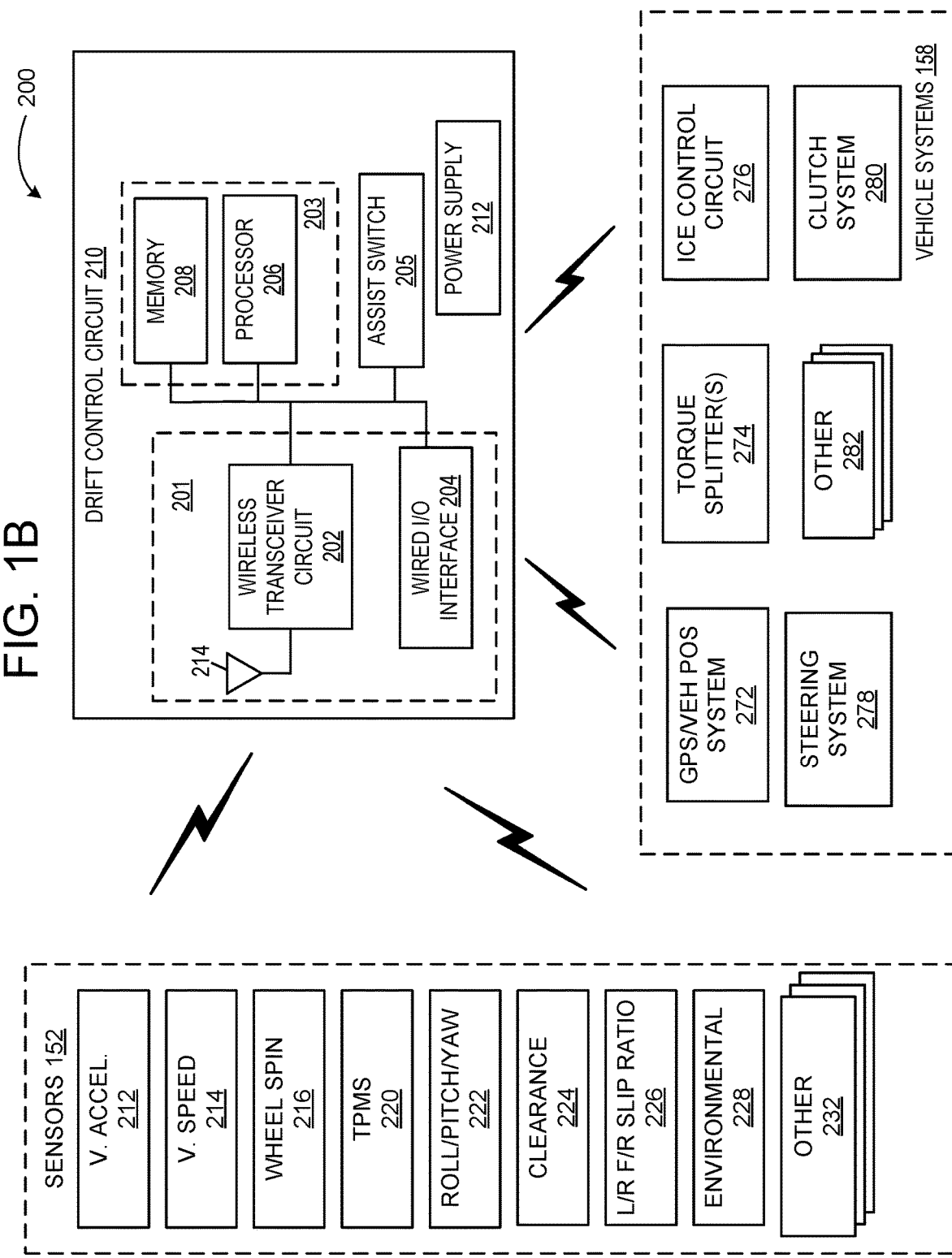
FIG. 1B illustrates an example architecture for a drift control system in the vehicle from FIG. 1A.

FIG. 1B illustrates an example architecture for system that can facilitate an interactive drift driving experience for a driver of a vehicle, while maintaining a safe/stable drift, in accordance with one embodiment of the systems and methods described herein. Referring now to FIG. 1B, in this example, drift control system 200 includes drift control circuit 210, a plurality of sensors 152, and a plurality of vehicle systems 158. Sensors 152 and vehicle systems 158 can communicate with drift control circuit 210 via a wired or wireless communication interface. Although sensors 152 and vehicle systems 158 are depicted as communicating with drift control circuit 210, they can also communicate with each other as well as with other vehicle systems. Drift control circuit 210 can be implemented as an ECU or as part of an ECU such as, for example electronic control unit 50. In other embodiments, drift control circuit 210 can be implemented independently of the ECU.

Drift control circuit 210 in this example includes a communication circuit 201, a decision circuit 203 (including a processor 206 and memory 208 in this example) and a power supply 212. Components of drift control circuit 210 are illustrated as communicating with each other via a data bus, although other communication in interfaces can be included. Drift control circuit 210 in this example also includes a manual assist switch 205 that can be operated by the user to manually select the assist mode.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. As will be described in greater detail below, memory 208 may also store a regions of a vehicle state space (i.e. a grip driving region, a stable drift region, and an unstable drift region). Memory 208, can be made up of one or more modules of one or more different types of memory, and may be configured to store data and other information as well as operational instructions that may be used by the processor 206 to drift control circuit 210.

Although the example of FIG. 1B is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a drift control circuit 210.

Communication circuit 201 may include either or both a wireless transceiver circuit 202 with an associated antenna 214 and a wired I/O interface 204 with an associated hardwired data port (not illustrated). As this example illustrates, communications with drift control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by drift control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 52 can include additional sensors that may or may not otherwise be included on a standard vehicle 10 with which drift control system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of autonomous control system 200. For example, additional sensors 232 may include sensors for throttle engagement (i.e. accelerator pedal position), brake engagement, clutch engagement, and steering wheel position. There may also be additional sensors for detecting and/or computing sideslip velocities, sideslip angles, percent sideslip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 10 tires and roadway, distance from center of gravity of vehicle 10 to front axle, distance from center of gravity of vehicle 10 to rear axle, total mass of vehicle 10, total longitudinal force, rear longitudinal force, front longitudinal force, total lateral force, rear lateral force, front lateral force, longitudinal speed, lateral speed, longitudinal acceleration, time derivatives of steering wheel position, time derivatives of throttle, gear, exhaust, revolutions per minutes, mileage, emissions, and/or other operational parameters of vehicle 10.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. internal combustion engine 14); steering systems 278 to turn the wheels of vehicle 10; clutch system 280; and other vehicle systems 282, such as, for example, an adjustable-height air suspension system.

During operation, drift control circuit 210 can receive information from various vehicle sensors which may be used to interpret a desired drift condition communicated by a driver of vehicle 10. Communication circuit 201 can be used to transmit and receive information between drift control circuit 210 and sensors 152, and drift control circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 used to interpret a desired drift condition communicated by a driver of vehicle 10. Additionally, communication circuit 201 can be used to send an activation signal or other activation information to various vehicle systems 158 as part of effectuating the desired drift condition. For example, as described in more detail below, communication circuit 201 can be used to send signals to, for example, one or more of: torque splitters 274 to control front/rear torque split and left/right torque split; ICE control circuit 276 to, for example, control motor torque, motor speed of the various motors in the system; steering system 278 to, for example, increase the slip angle of the tires; and clutch system 280 to, for example, approximate a "clutch kick" in order to increase the aggressiveness of a drift. The decision regarding what action to take via these various vehicle systems 158 can be made based on the information detected by sensors 152. Examples of this are described in more detail below.

Figure 2:
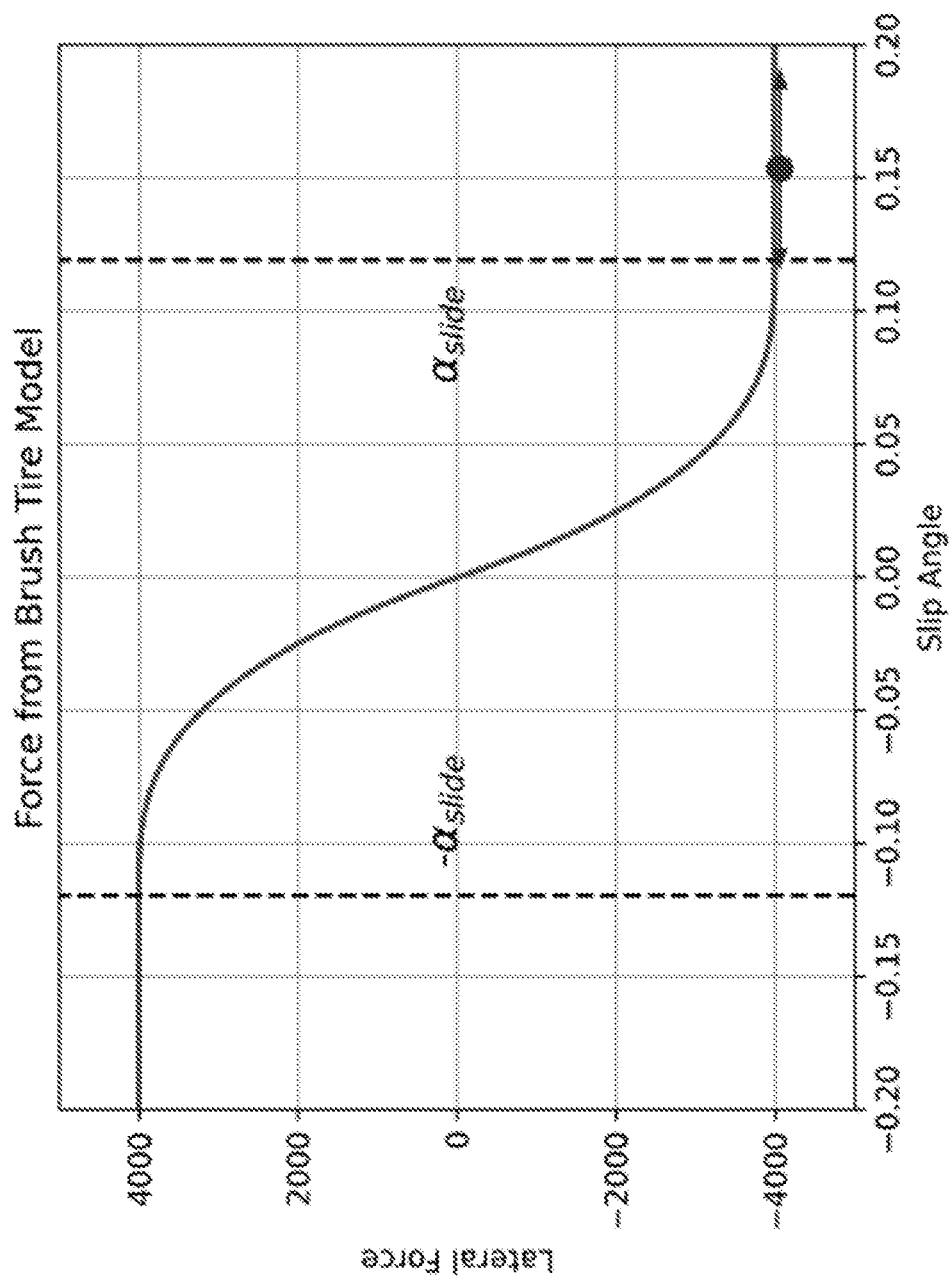
FIG. 2 is a graph illustrating an example relationship between the lateral force (or cornering force) experienced by a vehicle's rear tires during driving, and the slip angle of the tires.

FIG. 2 is a graph illustrating an example relationship between the lateral force (or cornering force) experienced by a vehicle's rear tires during driving, and the slip angle of the tires. Similar to the sideslip angle of a vehicle, the slip angle of a tire is the angle between the tire's linear velocity vector and the direction in which the tire is pointing. As the graph in FIG. 2 illustrates, within a certain range of slip angles (i.e. between $-\alpha_{slide}$ and $\alpha_{slide}$), as the magnitude of slip angle increases, the magnitude of lateral frictional force between the tires and the road increases as well. For example, as a vehicle negotiates a tight turn, the slip angle of its tires will increase, as will the lateral frictional force between its tires and the road surface. Of note, as FIG. 2 illustrates, there is a peak lateral force that a vehicle's tires can achieve before they begin to "slip." This is known as the tire's saturation point. Put another way, at $\alpha=|\alpha_{slide}|$, the cornering/lateral force saturates, and the tires lose traction with the road surface. For this reason, drift driving is often associated with high tire slip angles (as well as vehicle high sideslip angles), and cornering forces which exceed a vehicle's tire's peak lateral force limit.

Figure 3:
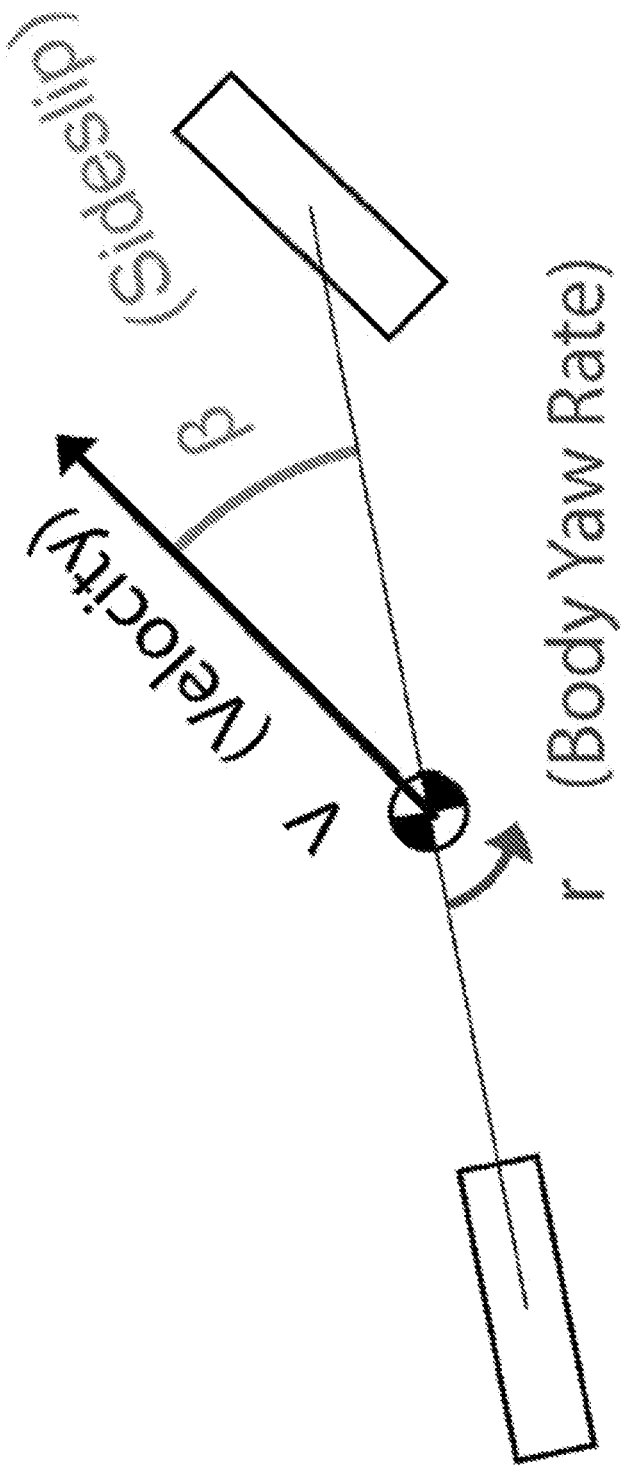
FIG. 3 is a diagram illustrating sideslip angle and yaw rate for an example vehicle.

FIG. 3 is a diagram illustrating sideslip angle and yaw rate for an example vehicle body. As discussed earlier, the sideslip angle of a vehicle, $\beta$, is the angle between the direction the vehicle is pointing, and the vehicle's linear velocity vector. The yaw rate of a vehicle, r, is the angular velocity of the vehicle about its yaw axis.

Figure 4:
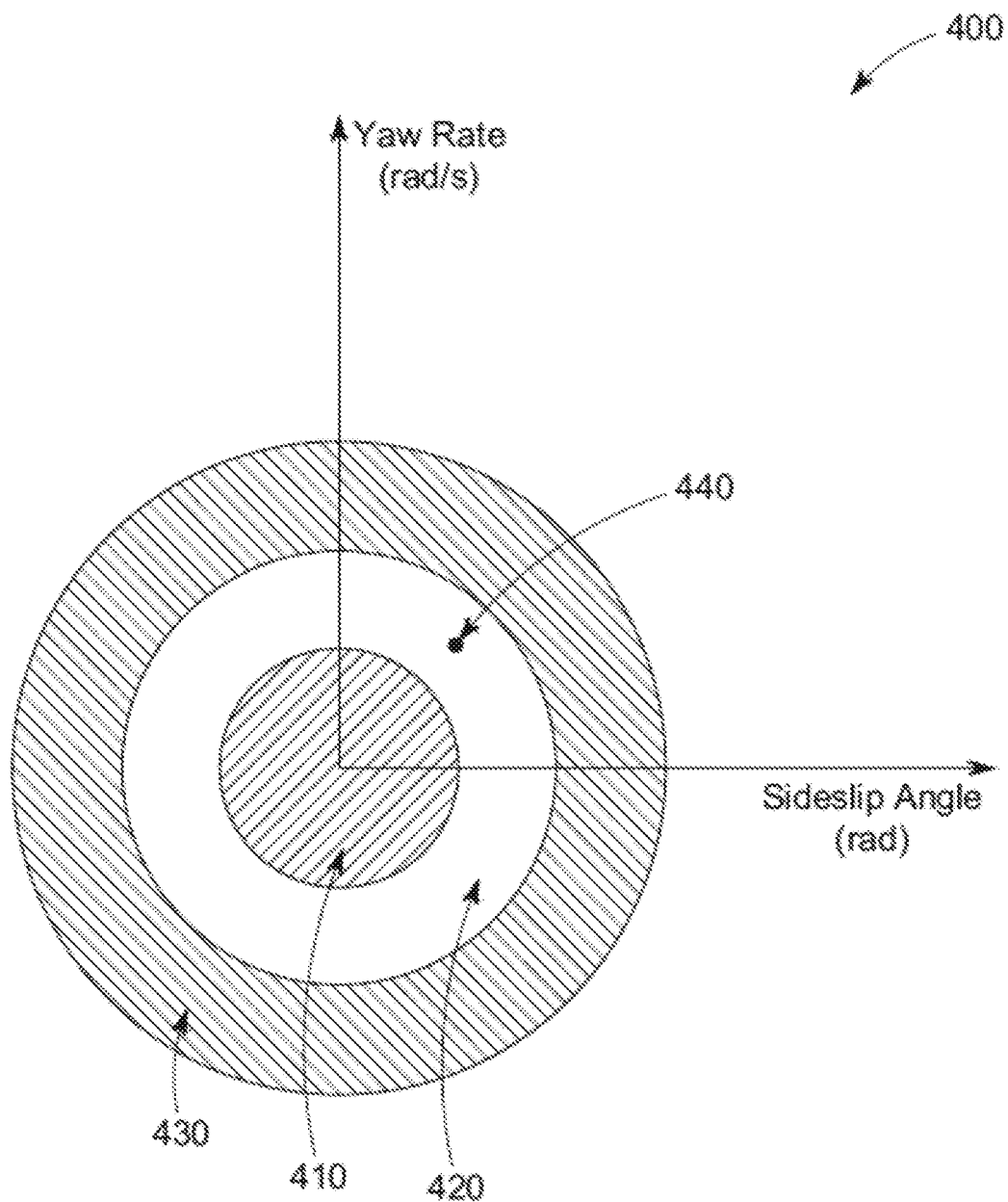
FIG. 4 is a graph illustrating a vehicle state space and an example vehicle state.

FIG. 4 is a graph illustrating a vehicle state space and an example vehicle state.

Vehicle state space 400 may be a graph or matrix which represents operation states of the vehicle. In the illustrated example, vehicle state space 400 is two-dimensional: the y-axis plots yaw rate (rad/s), and the x-axis plots sideslip angle (rad). However, in other embodiments the vehicle state space may be n-dimensional, where each dimension represents a different operational parameter for the vehicle (e.g. vehicle speed, vehicle acceleration, yaw rate, sideslip velocities, sideslip angles, percent sideslip, frictional forces, degree of steer, heading, trajectory, front slip angle corresponding to full tire saturation, rear slip angle corresponding to full tire saturation, maximum stable steering angle given speed/friction, gravitational constant, coefficient of friction between tires and roadway, distance from center of gravity of the vehicle to its front axle, distance from center of gravity of the vehicle to its rear axle, total mass of the vehicle, total longitudinal force, rear longitudinal force, front longitudinal force, total lateral force, rear lateral force, front lateral force, longitudinal speed, lateral speed, longitudinal acceleration, steering angle, throttle engagement, brake engagement, clutch engagement, mileage, emissions, and/or other operational parameters the vehicle).

Grip driving region 410 represents the region in vehicle state space 400 where a vehicle operates in the grip driving range. As alluded to earlier, the grip driving range is the set of operating conditions where the vehicle's tires maintain traction with the road's surface. In the illustrated example, grip driving region 410 is a two-dimensional area, with sideslip angle and yaw rate as parameters. However, like vehicle state space 400, grip driving region 410 may be n dimensional. In some embodiments, grip driving region 410 may be derived using expert driving data. In other embodiments, grip driving region 410 may be derived from learned information. In some embodiments, grip driving region 410 may be stored in memory 208.

Stable drift region 420 represents the region in vehicle state space 400 where a vehicle is in a controllable drift (e.g. controllable by the automatic braking, vehicle stability control, and traction control systems of a vehicle). In the illustrated example, stable drift region 420 is a two-dimensional area, with parameters for sideslip angle and yaw rate. However, like vehicle state space 400 and grip driving region 410, stable drift region 420 may be n dimensional. In some embodiments, stable drift region 420 may be derived using expert driving data. In other embodiments, stable drift region 420 may be derived from learned information. In some embodiments, stable drift region 420 may be stored in memory 208.

Unstable drift region 430 represents the region in vehicle state space 400 where a vehicle is in an uncontrollable drift. In the illustrated example, unstable drift region 430 is a two-dimensional area, with parameters for sideslip angle and yaw rate. However, unstable drift region 430 may be n dimensional. In some embodiments, unstable drift region 430 may be derived using expert driving data. In other embodiments, unstable drift region 430 may be derived from learned information. In some embodiments, unstable drift region 430 may be stored in memory 208.

Vehicle state 440 is a data set associated with the contemporaneous operation of a vehicle. In the illustrated example, vehicle state 440 is comprised of two parameters (i.e. sideslip angle and yaw rate). However, in other embodiments vehicle state 440 may be comprised of n parameters, including all of the parameters described above for vehicle state space 400. In some embodiments, drift control circuit 210 may obtain vehicle state 440 (i.e. vehicle state data) from sensors 152 and GPS/VEH Position System 272.

In the illustrated example, vehicle state 440 lies within stable drift region 420. Put another way, the vehicle associated with vehicle state 440 is operating in a stable (i.e. controllable) drift. However, in other examples vehicle state 440 may lie within grip driving region 410, or unstable drift region 430. Vehicle state 440 may also lie at the boundary between regions. For example, if vehicle state 440 were to lie at the boundary of grip driving region 410, and stable drift driving region 420, it would mean that the vehicle is at the transition between grip driving, and drift driving.

Figure 5:
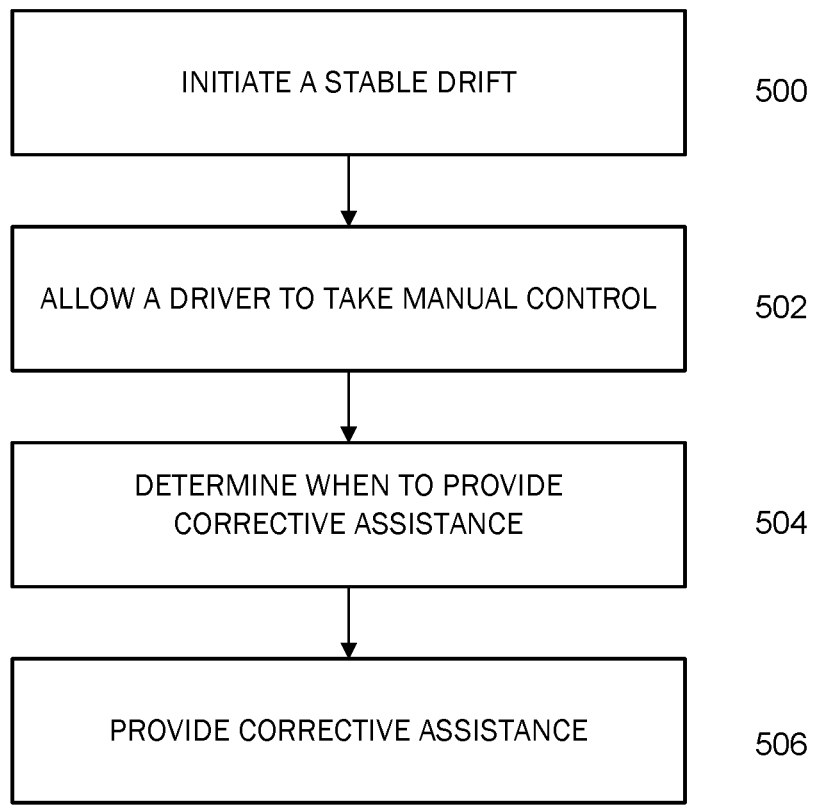
FIG. 5 is a flowchart illustrating example operations that can be performed to provide corrective assistance to a driver who is manually controlling a vehicle during a drift.

FIG. 5 is a flowchart illustrating example operations that can be performed to provide corrective assistance to a driver who is manually controlling a vehicle during a drift.

At operation 500, a stable drift is initiated. In some embodiments the stable drift may be initiated by a driver who is manually controlling the vehicle. In other embodiments, the stable drift may be initiated by an autonomous/assisted driving system (e.g. a driver may press a "drift initiation button" which instructs an autonomous/assisted driving system to initiate a stable drift). In these embodiments, the autonomous/assisted driving system may utilize a closed-loop control system in order to initiate the drift. A closed-loop control system (a.k.a. a feedback control system) is a type of control system in which the controlling action depends, in part, on the generated output of the system. More specifically, in a closed-loop control system, part of the generated output, (i.e. the feedback signal; which may be the output signal itself, or some function of the output), is returned to the reference input via a feedback loop. In this way, the generated output of the system is compared to the desired output/reference input. For example, a closed-loop system may generate an error signal, which is the difference between the reference input signal and the feedback signal. This error signal is fed to the system controller, which converts it into a control signal designed to reduce the error, thus driving the generated output of the system towards the desired output.

In some embodiments, a closed-loop, autonomous/assisted driving system may use control laws involving sideslip, wheel speed, yaw rate, and other vehicle operation states in order to keep the vehicle controllable while initiating the drift. In certain embodiments, the system may use non-linear control theory. In other embodiments, the system may use Model Predictive Control (MPC). In some embodiments, the system may be implemented using a closed-loop controller, such as drift control circuit 210. In some embodiments, drift control circuit 210 may send control signals to two or more actuators of vehicle 10 in order to initiate the stable drift. For example, drift control circuit 210 may send control signals to the throttle, steering, brake and clutch actuators of vehicle 10 in order to initiate the stable drift.

After a stable drift has been initiated, at operation 502, a driver of the vehicle may take manual control of the vehicle. In some embodiments where the stable drift has been initiated by an autonomous/assisted driving system, the autonomous/assisted driving system may maintain the stable drift for a short period of time before the driver is allowed to take full manual control. Specifically, in these embodiments, the driver may only take manual control of the vehicle if the driver's control inputs are within a certain error tolerance of the autonomous/assisted controls used to maintain the vehicle in a stable drift. For example, one or more interfaces of the vehicle may provide the driver with audiovisual or haptic feedback instructing the driver to increase/ decrease throttle, or increase/decrease counter-steering, etc., in order to better match the autonomous/assisted controls used to maintain the vehicle in a stable drift. Accordingly, once the driver's control inputs match the automated/assisted controls within a certain error tolerance, the driver may be allowed to take full manual control of the vehicle. In some embodiments, this may be accomplished by pressing a button (e.g. a "manual drift control button").

Once the driver has taken manual control of the vehicle, the driver may use various vehicle interfaces to perform manual control operations. Vehicle interfaces may include the steering wheel, the accelerator pedal, the brake pedal, a hand brake, a clutch pedal, the gear shift lever of a manual transmission vehicle, or any other interface which allows a driver to interact with the motive systems of the vehicle. A manual control operation is a manipulation of a vehicle interface by a driver, while the driver has manual control of the vehicle, which controls a motive system of the vehicle. Examples of manual control operations include a driver pressing on the accelerator pedal to control throttle, and a driver rotating the steering wheel to control steering.

While the driver has manual control of the vehicle during the drift, at operation 504, a determination to provide corrective assistance is made. In some embodiments, an autonomous/assisted driving system (as described above) may make this determination. In certain embodiments, the autonomous/assisted driving system may determine that corrective assistance is required when the driver attempts to operate the vehicle into an unstable drift. Put another way, the autonomous/assisted driving system may determine to provide corrective assistance in response to manual control operations which would bring the vehicle into an unstable drift. This determination may be made by correlating the vehicle state (e.g. vehicle state 440) to a vehicle state space (e.g. vehicle state space 400). For example, the autonomous/assisted driving system may correlate the vehicle state to the vehicle state space and learn that the vehicle is operating at or near the boundary between the stable drift region (e.g. stable drift region 420), and the unstable drift region (e.g. unstable drift region 430). If the automated/assisted driving system then detects increased pressure on the accelerator pedal, it may determine that the driver is attempting to operate the vehicle into an unstable drift.

In some embodiments, the autonomous/assisted driving system may determine to provide corrective assistance based on factors other than drift stability. For example, the autonomous/assisted driving system may determine corrective assistance is required to meet certain safety objectives, such as collision avoidance and staying on the road, regardless of drift stability. In some embodiments, safety objectives may be determined by inputting vehicle state data and environmental situation data into pre-selected safety protocols (these protocols may be set by the driver, the autonomous/assisted driving system, or the vehicle manufacturer). Similar to vehicle state data, environmental situation data is data associated with the contextual environment in which the vehicle operates. Environmental situation data may include information related to road features (e.g. road path, coefficient of friction between the road and tires, bank angle, number of lanes, etc.), moving and/or stationary objects in proximity to the vehicle's predicted trajectory (e.g. other vehicles, fallen trees, deer, etc.), and ambient weather conditions. In some embodiments, drift control circuit 210 may obtain environmental situation data from sensors 152 and GPS/VEH Position System 272.

As described above, the autonomous/assisted driving system may determine that corrective assistance is required in order to meet certain safety objectives, such as collision avoidance and staying on the road. Further, these safety objectives may be determined by inputting vehicle state data and environmental situation data into pre-selected safety protocols. As an example, the autonomous driving system may determine that corrective assistance is required to meet an objective of staying on the road, even when the driver is controlling the vehicle in a stable drift. In this example, the autonomous system will use vehicle state data (i.e. vehicle speed, vehicle location, etc.) and environmental situation data (i.e. road path, coefficient of friction between the road and tires, etc.) to make this determination.

At operation 506, corrective assistance is provided based on the determination in the previous operation. As described above, an autonomous/assisted driving system may provide corrective assistance by sending control signals to multiple actuators of the vehicle. For example, the autonomous/assisted driving system may send control signals to the throttle actuator (i.e. reduce throttle), or the brake actuator (i.e. increase braking), in order to keep the vehicle in a stable drift. More generally, the autonomous/assisted driving system may send control signals to any combination of the throttle, steering, brake, and clutch actuators of a vehicle (e.g. vehicle 10), in order to keep the vehicle within a stable drift.

Figure 6:
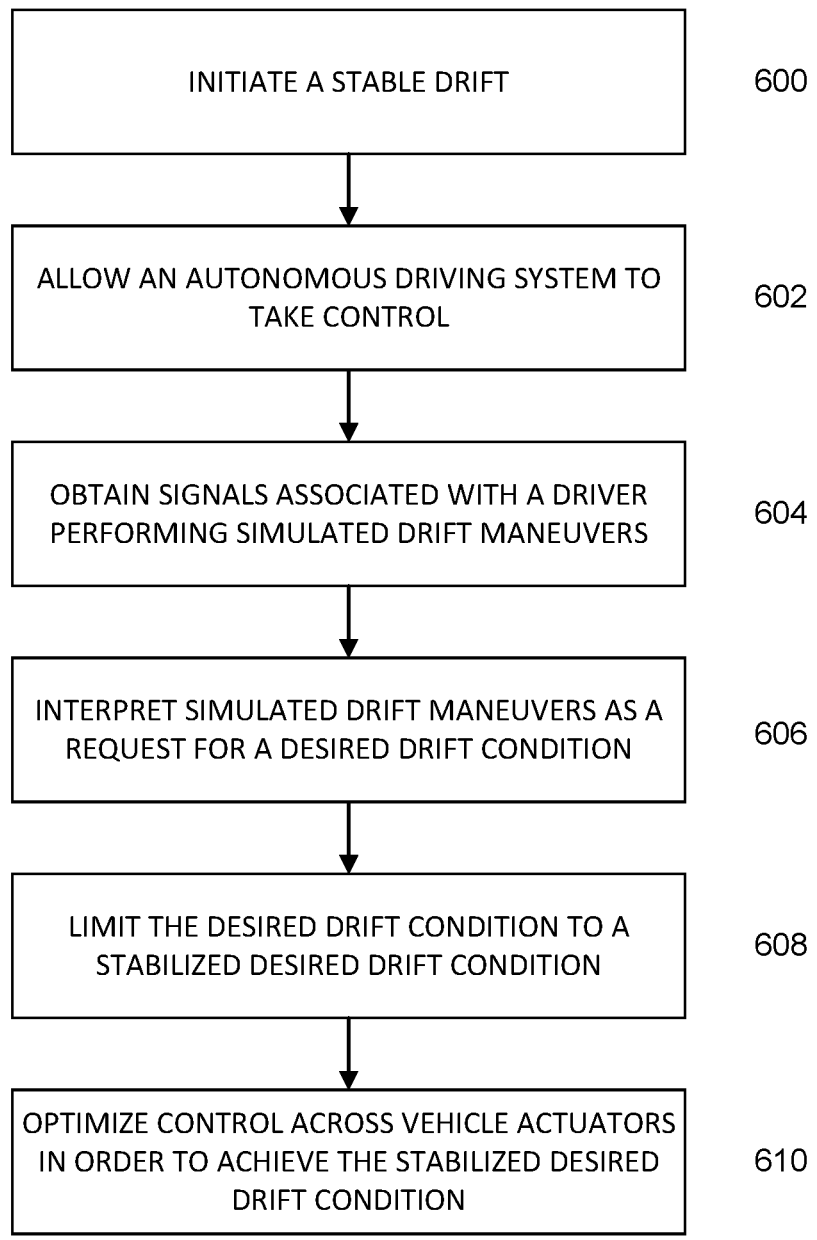
FIG. 6 is a flowchart illustrating example operations that can be performed to autonomously control a vehicle throughout a drift, while also responding to simulated drift maneuvers performed by a driver.

FIG. 6 is a flowchart illustrating example operations that can be performed to autonomously control a vehicle throughout a drift, while also responding to simulated drift maneuvers performed by a driver of the vehicle. In the embodiments illustrated by FIG. 6, it should be understood that performance of a simulated drift maneuver is decoupled from direct manual control of the vehicle (corrected or otherwise). As will be described in greater detail below, a simulated drift maneuver may communicate the driver's desire to enter a particular drift condition to the autonomous driving system, however it is the autonomous driving system, not the driver, which controls the vehicle during the drift. Thus, the embodiments illustrated by FIG. 6 are different than those illustrated in FIG. 5, where a driver has direct manual control of the vehicle during the drift, and an autonomous/assisted driving system merely provides corrective assistance.

At operation 600, a stable drift is initiated. The stable drift may be initiated in the same/similar way as described in conjunction with operation 500 of FIG. 5.

Once a stable drift has been initiated, at operation 602, an autonomous driving system takes control of the vehicle during the drift. In some embodiments, this may involve a driver selecting an automated drift driving mode (e.g. by pushing an automated drift driving button). In other embodiments, the autonomous driving system may have default control of the vehicle after the stable drift has been initiated (i.e. no driver intervention is required to cede control to the autonomous driving system).

As alluded to above, the autonomous driving system may use a closed-loop system to control the vehicle during the drift. The closed-loop system may use control laws involving sideslip, wheel speed, yaw rate, and other vehicle operation states in order to keep the vehicle controllable during the drift. In certain embodiments, the closed-loop system may use non-linear control theory. In other embodiments, the closed-loop controller may use Model Predictive Control (MPC). In some embodiments, the closed-loop system may use a closed-loop controller, e.g. drift control circuit 210, to send control signals to two or more actuators of the vehicle in order to control the vehicle during the drift. For example, drift control circuit 210 may send control signals to the throttle, steering, brake and clutch actuators of vehicle 10 in order to control the vehicle during the drift.

As alluded to above, the autonomous driving system will control the vehicle in a manner that prevents the vehicle from entering an unstable drift. In some embodiments, the autonomous driving system may utilize an understanding of a vehicle state space in order to accomplish this. For example, the autonomous driving system may correlate vehicle states to the vehicle state space to ensure that the vehicle avoids the unstable drift region.

While the autonomous driving system is controlling the vehicle in a stable drift, at operation 604, signals associated with a driver of the vehicle performing simulated drift maneuvers on one or more interfaces of the vehicle, are obtained. As described above, vehicle interfaces may include the steering wheel, the accelerator pedal, the brake pedal, a hand brake, a clutch pedal, the gear shift lever of a manual transmission vehicle, or any other interface which allows a driver to interact with the motive systems of a vehicle. In some embodiments, drift control circuit 210 may obtain the signals associated with a driver performing simulated drift maneuvers from sensors 152 of vehicle 10.

A simulated drift maneuver is a manipulation of a vehicle interface by a driver which may communicate the driver's desire to (1) drift more aggressively (e.g. higher sideslip angle, higher yaw rate, higher linear velocity, etc.); (2) drift less aggressively (e.g. lower sideslip angle, lower yaw rate, lower linear velocity, etc.); or (3) exit the drift. As alluded to above, performance of a simulated drift maneuver is decoupled from direct manual control of the vehicle (corrected or otherwise). Put another way, while an autonomous control system maintains control of the vehicle throughout the drift, a driver may perform simulated drift maneuvers to communicate their desire to enter a particular drift condition. As an example, an inexperienced driver may attempt a clutch kick which would be unsuccessful if he/she had direct manual control of the vehicle (e.g. the driver released the clutch pedal too slowly, or the driver failed to raise the engine speed in combination with the clutch kick). However, the imperfect clutch kick may still communicate the driver's desire to increase the aggressiveness of the drift to the autonomous driving system. Put another way, the autonomous driving system may understand what the driver intended to do—perform a clutch kick in order to increase the aggressiveness of the drift—and the autonomous system may adjust the drift condition of the vehicle accordingly.

Examples of simulated drift maneuvers may include counter-steering, increasing pressure on the accelerator pedal (i.e. increasing throttle), engaging the hand brake (e.g. in an attempt at a handbrake turn), and clutch kicking. As will be described in more detail below, the aforementioned examples may communicate a driver's desire to enter a more aggressive drift. However, simulated drift maneuvers may also communicate a driver's desire to enter a less aggressive drift, or exit a drift. For example, applying gradual pressure on the brake pedal, or releasing pressure on the accelerator pedal are simulated drift maneuvers that may communicate a driver's desire to enter a less aggressive drift, or exit a drift. Finally, it should be understood that a driver may perform multiple simulated drift maneuvers at the same time, or in quick succession. For example, a driver may begin to counter-steer while applying steady pressure on the accelerator pedal, and then attempt a clutch kick while pulsing the accelerator pedal, all while continuing to counter-steer. As alluded to above, sensors 152 of vehicle 10 may detect these simulated drift maneuvers and communicate them to drift control circuit 210.

At operation 606, one or more simulated drift maneuvers are interpreted as a request for a desired drift condition. In some embodiments, drift control circuit 210 may make this interpretation.

Similar to a vehicle state, a drift condition is a set of operational conditions associated with a vehicle while drifting. For example, while drifting at the apex of a first curve, a vehicle may have a sideslip angle of 1.4 rad, a yaw rate of −1.2 rad/s, and a linear velocity of 15 m/s. While drifting at the apex of a second curve, the vehicle may have sideslip angle of 1.9 rad, a yaw rate of 1.7 rad/s, and a linear velocity of 11 m/s. In these examples, the vehicle's drift condition is represented by three parameters: sideslip angle, yaw rate, and linear velocity. However, in other embodiments a vehicle's drift condition may be represented by n parameters.

During operation 606, different simulated drift maneuvers may be interpreted as requests for different desired drift conditions. For example, increased counter-steering, increased throttle, and the performance of a clutch kick may be interpreted as requests for a more aggressive drift condition (i.e. higher sideslip angle, higher yaw rate, higher linear velocity etc.). By contrast, decreased counter-steering, decreased throttle, and gradual braking may be interpreted as requests for a less aggressive drift condition (i.e. lower sideslip angle, lower yaw rate, lower linear velocity, etc.). In addition, it should be understood that (1) simulated drift maneuvers can be nuanced, and may be interpreted as such; and (2) multiple simulated drift maneuvers may be interpreted at once. For example, a relatively gradual increase in counter-steering may be interpreted as a request for aggressive drift condition 1, while a more dramatic increase in counter-steering combined with an increase in throttle may be interpreted as a request for aggressive drift condition 2, while an increase in counter-steering combined with a clutch kick may be interpreted as a request for aggressive drift condition 3. When effectuated, each of the aforementioned aggressive drift conditions may provide a different experience for the driver. For example, aggressive drift condition 2 may have a relatively higher linear velocity than aggressive drift condition 3, but a lower yaw rate. Accordingly, by providing a driver with multiple vehicle interfaces on which to perform simulated drift maneuvers (e.g. steering wheel, accelerator pedal, clutch pedal, brake pedal etc.), embodiments of the disclosed technology allow the driver to communicate a broader and more nuanced range of desired drift conditions than would a system which only provides one or two vehicle interfaces to a driver on which to perform simulated drift maneuvers.

In some embodiments, simulated drift maneuvers may be interpreted using learned models built from data generated by expert human drivers performing various drift maneuvers. More specifically, learned models may be built which correlate sensor data generated by expert drivers (i.e. steering angle, time derivatives of steering angle, accelerator/clutch pedal position, time derivatives of accelerator/clutch pedal position, etc.) with the drift condition of a vehicle (i.e. sideslip angle, yaw rate, linear velocity, etc.). These models may then be used to interpret simulated drift maneuvers performed by another driver.

In some embodiments, vehicle state data and environmental situation data may be considered when interpreting simulated drift maneuvers. For example, knowledge of the sideslip angle of the vehicle may be required to determine whether a driver is counter-steering, or steering into a turn.

Moreover, depending on the aggressiveness of the current drift (e.g. sideslip angle, yaw rate, linear velocity, etc.), a driver's counter-steering at a particular rate may communicate a desire to increase, or decrease the aggressiveness of the drift. Likewise, road features, such as road path, may be used to interpret a simulated drift maneuver. For example, a particular simulated drift maneuver may be interpreted differently when the vehicle is approaching a curve in the road, than it would while at the apex of the curve.

At operation 608, the desired drift condition is limited to a stable drift condition which approximates the desired drift condition, i.e. the "stabilized desired drift condition." Put another way the stabilized desired drift condition is a stable drift condition which approximates the desired drift condition. In some embodiments, the stabilized desired drift condition may be the closest possible stable drift condition. In other embodiments, the stabilized desired drift condition need not be the closest possible stable drift condition. As will be discussed in greater detail below, the desired drift condition may be limited across various parameters. For example, the desired drift condition may be limited to sideslip angles of less than or equal to 1.2 rad, yaw rates of less than or equal to 0.9 rad/s, and linear velocities of less than or equal to 13.5 m/s.

In some embodiments, the desired drift condition may be limited by correlating it to a vehicle state space, e.g. vehicle state space 400. For example, if the desired drift condition lies within, or at the boundary of a stable drift region (e.g. stable drift region 420), the desired drift condition may not be limited. If however, the desired drift condition lies in an unstable drift region (e.g. unstable drift region 430), the desired drift condition may be limited to the closest possible drift condition in the stable drift region of a vehicle state space.

In some embodiments, vehicle state data and environmental situation data may be considered when limiting the desired drift condition. For example, factors such as vehicle speed, vehicle trajectory, road path, and obstacles in the vehicle's proximity may be considered when limiting the desired drift condition. Put another way, the desired drift condition may not only be limited to a stable drift condition, but a stable drift condition which meets a set of safety objectives (e.g. collision avoidance, staying on the road, etc.). Accordingly, the stabilized desired drift condition would not only be a drift condition which is controllable, but also one which meets a set of safety objectives. As described above, safety objectives may be determined by inputting vehicle state data and environmental situation data into pre-selected protocols. These protocols may be selected by different entities, such as the driver, an autonomous driving system, or the vehicle manufacturer.

At operation 610, control of the vehicle is optimized in order to achieve the stabilized desired drift condition. Control may be optimized across two or more actuators of the vehicle, such as the throttle, steering, clutch, and brake actuators of vehicle 10. As alluded to above, the autonomous driving system may use a closed-loop controller, e.g. drift control circuit 210, to optimize control of the vehicle in order to achieve the stabilized desired drift condition. In certain embodiments, the closed-loop controller may use a non-linear model predictive control (NMPC) framework in order to optimize control of the vehicle. Put another way, based on vehicle state and environmental situation, the system may use the NMPC framework to determine which set of vehicle actuators to use in order to achieve the stabilized desired drift condition. In some embodiments, learned models built from data generated by expert human drivers may be used to perform this optimization. Specifically, these models may learn how expert human drivers engage different vehicle inputs/actuators in order to achieve different drift conditions. In some embodiments, these learned models may be used in combination with an NMPC framework in order to optimize control of the vehicle.

Figure 7A:
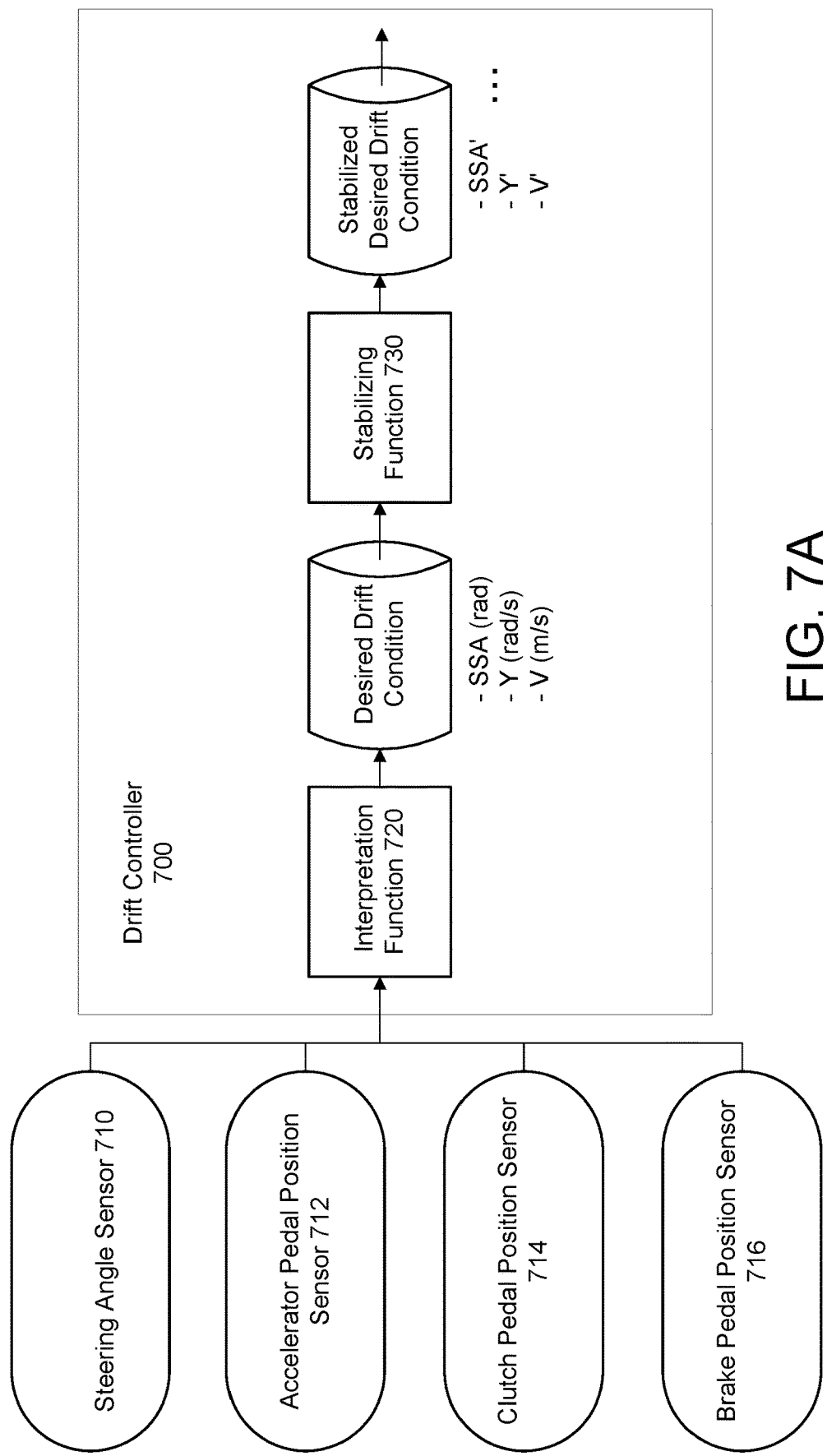
FIGS. 7A and 7B illustrate an example drift controller architecture.
Figure 7B:
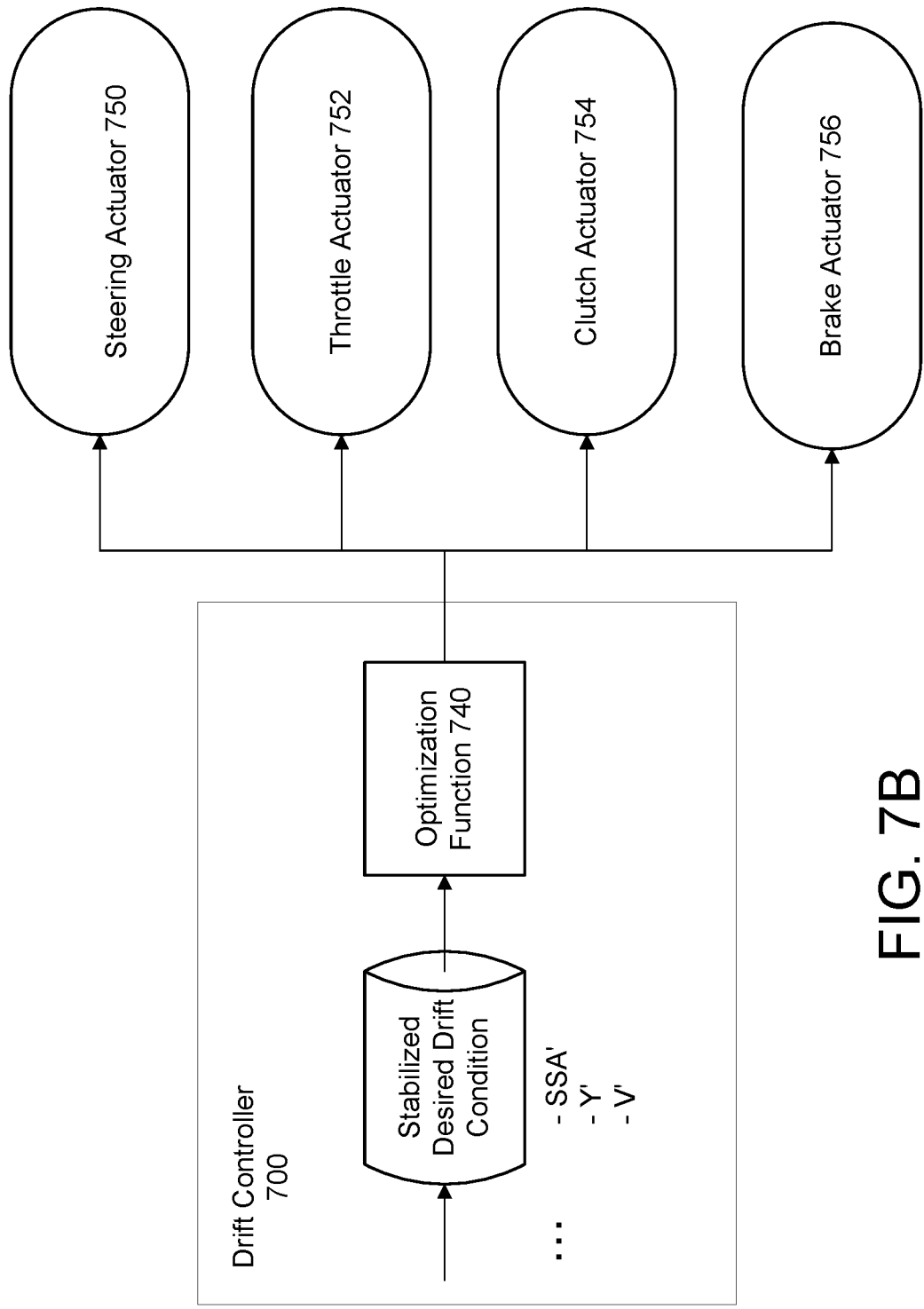

FIGS. 7A and 7B illustrate an example drift controller architecture. In the illustrated example, drift controller 700 receives inputs from steering angle sensor 710, accelerator pedal position sensor 712, brake pedal position sensor 714, and clutch pedal position sensor 716. As described above, steering angle sensor 710 may be coupled to the steering wheel of vehicle 10, and may be connected to drift controller 700 by wire. Likewise, accelerator pedal position sensor 712, brake pedal position sensor 714, and clutch pedal position sensor 716 may be coupled to the accelerator, brake, and clutch pedals of vehicle 10 respectively, and may be connected to drift controller 700 by wire.

Signals from the aforementioned sensors (i.e. signals associated with simulated drift maneuvers performed by a driver of the vehicle) are input into interpretation function 720. Interpretation function 720 may be a linear or non-linear function. In some embodiments, interpretation function 720 may be derived using data generated by expert human drivers performing various drift maneuvers. For example, learned models may be built which correlate sensor inputs generated by these expert drivers, with changes in the drift condition of a vehicle. These models may then be used to interpret sensor inputs generated by other drivers. Based on the aforementioned inputs, interpretation function 720 outputs a desired drift condition. In this example, the desired drift condition has three parameters, sideslip angle (rad), yaw rate (rad/s), and linear velocity (m/s). In other embodiments, the desired drift condition may have additional parameters, such as slip angle of the rear tires, linear acceleration, etc.

Although not pictured, as alluded to above, interpretation function 720 may also receive vehicle state data and environmental situation data as inputs.

The desired drift condition is then input into stabilizing function 730. Stabilizing function 730 limits the desired drift condition to a stable drift condition, i.e. the "stabilized desired drift condition." Put another way the stabilized desired drift condition is a stable drift condition which approximates the desired drift condition. In some embodiments, the stabilized desired drift condition may be the closest possible stable drift condition. In other embodiments, the stabilized desired drift condition need not be the closest possible stable drift condition.

Stabilizing function 730 limits the desired drift condition by limiting various operation state parameters. In the illustrated example, stabilizing function 730 may limit any combination of, sideslip angle, yaw rate, and linear velocity such that the resulting output is a stable drift condition. For example, stabilizing function 730 may limit the desired drift condition to sideslip angles of less than or equal to 1.2 rad, yaw rates of less than or equal to 0.9 rad/s, and linear velocities of less than or equal to 13.5 m/s. Thus, if interpretation function 720 outputs a desired drift condition with a sideslip angle of 1.5 rad, yaw rate of 1.4 rad/s, and linear velocity of 12 m/s, stabilizing function 730 will output a stabilized desired drift condition with a sideslip angle of 1.2 rad, a yaw rate of 0.9 rad/s, and a linear velocity of 12 m/s.

In some embodiments, stabilizing function 730 may limit the desired drift condition by correlating it to a vehicle state space. For example, if the desired drift condition lies within, or at the boundary of the stable drift region (e.g. stable drift region 420), stabilizing function 730 may not limit the desired drift condition. If however, the desired drift condition lies inside the unstable drift region (e.g. unstable drift region 430), stabilizing function 730 may limit the desired drift condition to the condition on the stable drift region which is closest to the desired drift condition. Put another way, the output of stabilizing function 730 would be the drift condition in the stable drift region which is closest to the desired drift condition in a vehicle state space.

Although not pictured, as alluded to above, stabilizing function 730 may also receive vehicle state data and environmental situation data as inputs. Accordingly, stabilizing function 730 may not just limit the desired drift condition to a stable drift condition, but a stable drift condition which meets a set of safety objectives, such as collision avoidance and staying on the road.

The stabilized desired drift condition is input into optimization function 740. In the illustrated example, optimization function 740 optimizes control of vehicle 10 across four actuators (steering actuator 750, throttle actuator 752, clutch actuator 754, brake actuator 756) in order to achieve the stabilized desired drift condition. However, in other embodiments, optimization function 740 may optimize control of vehicle 10 across n actuators. The output of optimization function 740 is a set of drift control signals sent to the actuators of the vehicle. For example, drift control signals sent to steering actuator 750 may include instructions to increase counter-steering in order to increase the aggressiveness of a drift, or decrease counter-steering in order to decrease the aggressiveness of a drift, or exit a drift. Likewise, drift control signals sent to throttle actuator 752 may include instructions to increase throttle in order to increase the aggressiveness of a drift, or decrease throttle in order to decrease the aggressiveness of a drift, or exit a drift. Drift control signals sent to clutch actuator 754 may include instructions to disengage and then rapidly reengage the clutch in order to use engine momentum to increase the aggressiveness of a drift. Further, drift control signals sent to brake actuator 756 may include instructions to increase braking in order to decrease the aggressiveness of a drift, or exit a drift. Finally, optimization function 740 may send multiple drift control signals simultaneously, or in quick succession to any combination of steering actuator 750, throttle actuator 752, clutch actuator 754, and brake actuator 756. For example, if optimization function 740 determines that the stabilized desired drift condition is best actualized by a clutch kick, optimization function 740 may output control signals to steering actuator 750 (increase counter-steering), throttle actuator 752 (increase throttle), and clutch actuator 754 (disengage and rapidly reengage the clutch in connection with increasing the throttle) in order to actualize the stabilized desired drift condition.

As alluded to above, optimization function 740 may utilize a non-linear model predictive control (NMPC) framework in order to optimize control of the vehicle. Specifically, the NMPC framework may determine which set of actuators to use in order to actualize the stabilized desired drift condition, based in part on vehicle state and environmental situation data. In some embodiments, optimization function 740 may utilize learned models built from data generated by expert human drivers (as described above). In some embodiments, optimization function 740 may utilize these learned models in combination with an NMPC framework.

Figure 8:
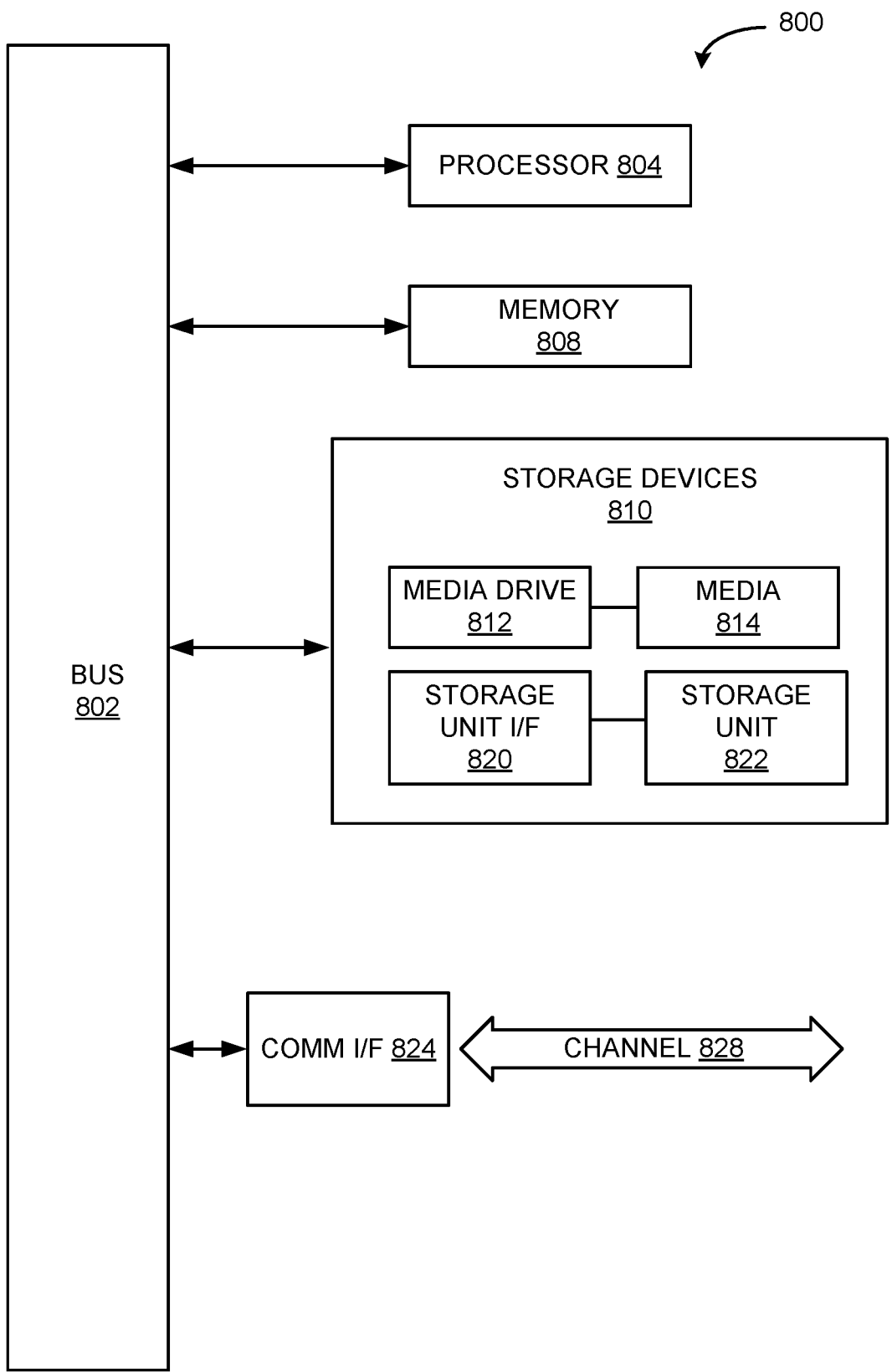
FIG. 8 illustrates an example computing system that may be used in implementing various features of embodiments of the disclosed technology.

Referring now to FIG. 8, computing system 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1A and 1B and described herein. Computing system 800 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 800 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 804 is connected to a bus 802, although any communication medium can be used to facilitate interaction with other components of computing system 800 or to communicate externally.

Computing system 800 might also include one or more memory modules, simply referred to herein as main memory 808. For example, in some embodiments random access memory (RAM) or other dynamic memory, might be used for storing information and instructions to be executed by processor 804. Main memory 808 might also be used for storing temporary variables or other intermediate information during execution of instructions to be executed by processor 804. Computing system 800 might likewise include a read only memory ("ROM") or other static storage device coupled to bus 602 for storing static information and instructions for processor 804.

The computing system 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), a flash drive, or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing system 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a flash drive and associated slot (for example, a USB drive), a PCMCIA slot and card, and other fixed or removable storage units 822 and interfaces 820 that allow software and data to be transferred from the storage unit 822 to computing system 800.

Computing system 800 might also include a communications interface 824. Communications interface 824 might be used to allow software and data to be transferred between computing system 800 and external devices. Examples of communications interface 824 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 800 to perform features or functions of the disclosed technology as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method, comprising:
    initiating, by an ECU of a vehicle, a stable drift;
    obtaining, by the ECU, signals associated with a driver of the vehicle performing simulated drift maneuvers on one or more interfaces of the vehicle;
    interpreting, by the ECU, the signals associated with the simulated drift maneuvers as a request for a desired drift condition;
    limiting, by the ECU, the desired drift condition to a stable drift condition which approximates the desired drift condition; and
    optimizing, by the ECU, control of the vehicle across multiple actuators of the vehicle in order to achieve the stable drift condition which approximates the desired drift condition.

2. The computer implemented method of claim 1, wherein initiating the stable drift comprises optimizing control of the vehicle across multiple actuators of the vehicle.

3. The computer implemented method of claim 1, wherein:
    the one or more interfaces of the vehicle comprise an accelerator pedal, a steering wheel, a brake pedal, and a clutch pedal; and
    the multiple actuators of the vehicle comprise a throttle actuator, a steering actuator, a brake actuator, and a clutch actuator.

4. The computer implemented method of claim 1, wherein:
    initiating the stable drift is based, in part, on an understanding of a vehicle state space;
    limiting the desired drift condition to a stable drift condition which approximates the desired drift condition comprises correlating the desired drift condition to the vehicle state space.

5. The computer implemented method of claim 4, wherein the stable drift condition which approximates the desired drift condition is the closest stable drift condition to the desired drift condition in the vehicle state space.

6. The computer implemented method of claim 1, further comprising:

in response to simulated drift maneuvers performed by the driver of the vehicle during the stable drift, controlling, by the ECU, the vehicle in a manner that meets a set of safety objectives; and limiting, by the ECU, the desired drift condition to a drift condition which meets the set of safety objectives.

7. The computer implemented method of claim 6, wherein the set of safety objectives comprise collision avoidance and staying on a road.

8. A vehicle comprising:
an ECU including machine executable instructions in non-transitory memory to:
initiate a stable drift for the vehicle; and
in response to manual control operations performed by a driver of the vehicle during the stable drift, provide corrective assistance in order to prevent the vehicle from entering an unstable drift, or in response to simulated drift maneuvers performed by a driver of the vehicle during the stable drift, control the vehicle in a manner that prevents the vehicle from entering an unstable drift; by sending drift control signals to one or more of a steering-by-wire system, a throttle-by-wire system, a clutch-by-wire system, and a brake-by-wire system, each communicating manual control operations and simulated drift maneuvers performed by the driver to the ECU, and actualizing drift control signals sent by the ECU.

9. The vehicle of claim 8, wherein:
the drift control signals sent to the steering-by-wire system include instructions to increase counter-steering in order to increase the aggressiveness of the stable drift, and decrease counter-steering in order to decrease the aggressiveness of the stable drift, or exit the stable drift;
the drift control signals sent to the throttle-by-wire system include instructions to increase throttle in order to increase the aggressiveness of the stable drift, and decrease throttle in order to decrease the aggressiveness of the stable drift, or exit the stable drift;
the drift control signals sent to the brake-by-wire system include instructions to increase braking in order to decrease the aggressiveness of the stable drift, or exit the stable drift; and
the drift control signals sent to the clutch-by-wire system include instructions to disengage and then rapidly reengage the clutch in order to increase the aggressiveness of the stable drift.

10. The vehicle of claim 9, wherein:
increasing the aggressiveness of the stable drift comprises increasing any one, or combination of, sideslip angle of the vehicle, yaw rate of the vehicle, and linear velocity of the vehicle, during the stable drift; and
decreasing the aggressiveness of the stable drift comprises decreasing any one, or combination of, sideslip angle of the vehicle, yaw rate of the vehicle, and linear velocity of the vehicle, during the stable drift.

11. A vehicle comprising:
an ECU including machine executable instructions in non-transitory memory to:
initiate a stable drift;
obtain signals associated with a driver of the vehicle performing simulated drift maneuvers on one or more interfaces of the vehicle;
interpret the signals associated with the simulated drift maneuvers as a request for a desired drift condition;
limit the desired drift condition to a stable drift condition which approximates the desired drift condition; and
optimize control of the vehicle across multiple actuators of the vehicle in order to achieve the stable drift condition which approximates the desired drift condition.

12. The vehicle of claim 11, wherein initiating the stable drift comprises optimizing control of the vehicle across multiple actuators of the vehicle.

13. The vehicle of claim 11, wherein:
the one or more interfaces of the vehicle comprise an accelerator pedal, a steering wheel, a brake pedal, and a clutch pedal; and
the multiple actuators of the vehicle comprise a throttle actuator, a steering actuator, a brake actuator, and a clutch actuator.

14. The vehicle of claim 11, wherein:
initiating the stable drift is based, in part, on an understanding of a vehicle state space; and
limiting the desired drift condition to a stable drift condition which approximates the desired drift condition comprises correlating the desired drift condition to the vehicle state space.

15. The vehicle of claim 14, wherein the stable drift condition which approximates the desired drift condition is the closest stable drift condition to the desired drift condition in the vehicle state space.

16. The vehicle of claim 11, further comprising machine executable instructions in non-transitory memory to:
in response to simulated drift maneuvers performed by the driver of the vehicle during the stable drift, control the vehicle in a manner that meets a set of safety objectives; and
limit the desired drift condition to a drift condition which meets the set of safety objectives.

17. The vehicle of claim 16, wherein the set of safety objectives comprise collision avoidance and staying on a road.

* * * * *